April 24, 1951     R. CHAMBERS     2,549,774
AUTOMOBILE STEERING WHEEL SPINNER
Filed Nov. 1, 1949
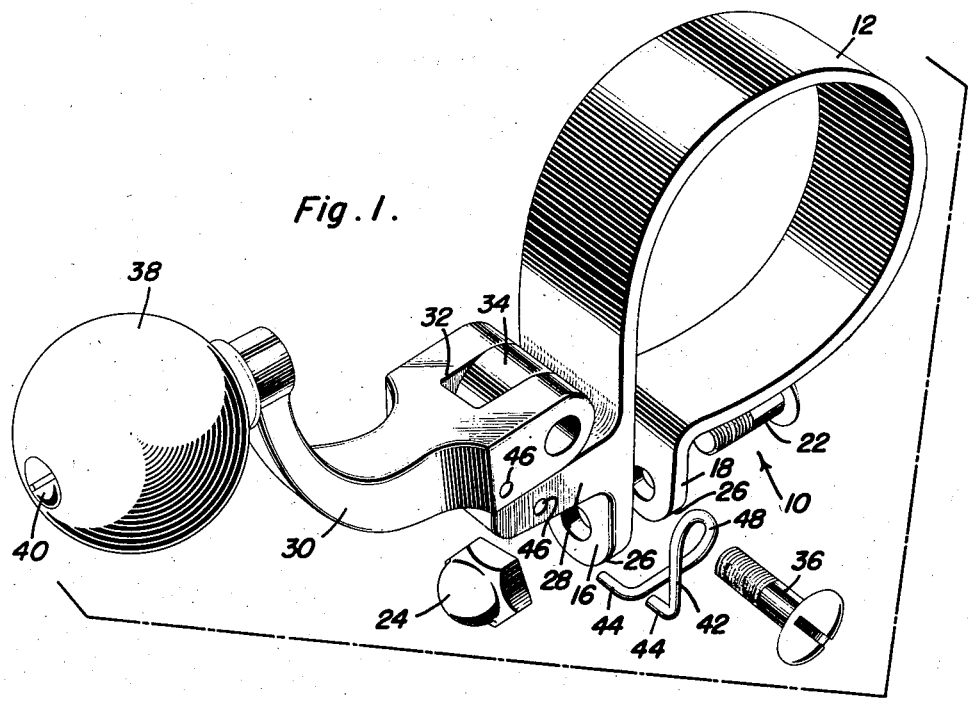
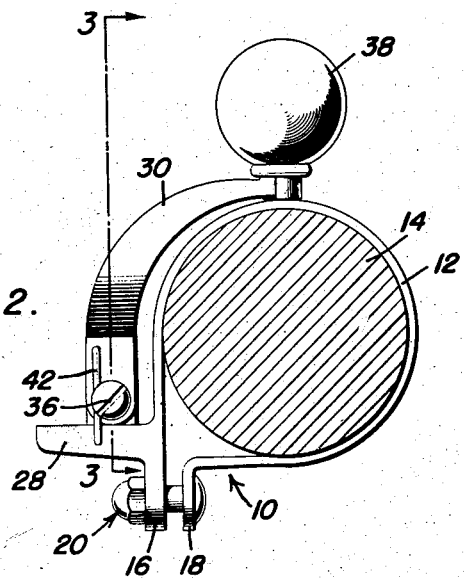
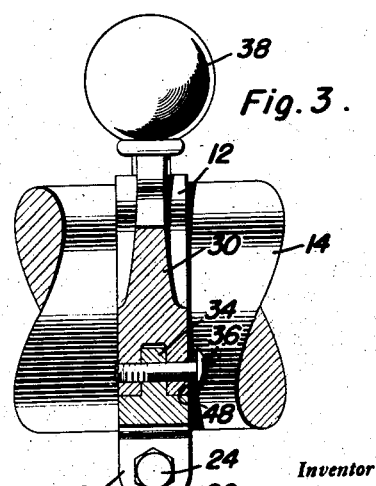
Inventor
Raymond Chambers
By Clarence A. O'Brien
and Harvey B. Jacobson
Attorneys Patented Apr. 24, 1951

2,549,774

UNITED STATES PATENT OFFICE 2,549,774

AUTOMOBILE STEERING WHEEL SPINNER

Raymond Chambers, Long Beach, Calif.

Application November 1, 1949, Serial No. 124,840

3 Claims. (Cl. 74—557)

This invention relates to steering knob attachments for steering wheels, and more particularly pertains to devices of this character wherein the hand grip member, of which the spinner knob forms a part, is pivotally connected to the wheel clamp.

The primary object of this invention is to provide a steering knob attachment for steering wheels, which will enable a driver to efficaciously and rapidly manipulate a steering wheel, yet which will not constitute an obstruction or hazard when not in use.

Another important object of this invention is to provide a spinner knob which may be readily placed in operative position relative to a steering wheel and which is normally positioned in an out-of-the-way inoperative position.

Still another object of this invention is to provide a device in conformity with the foregoing objects and is to so connect the spinner knob to the steering wheel that the means connecting the spinner knob and the steering wheel will not interfere with the use or operation of the spinner knob.

A meritorious feature of the present invention resides in an arcuate arm having one end hingedly connected to the wheel clamp and the other end pivotally connected to the spinner arm, and which conforms substantially to the transverse curvature of a steering wheel rim.

Another feature of the present invention resides in the spinner knob being disposed substantially diametrically opposite the spaced ends of the clamp, when the spinner knob is in the operative position, thereby being subject to the minimum of interference therefrom.

A final feature to be specifically enumerated herein resides in the outward pivotal movement of the arcuate arm being limited by the clamp base, so that the arcuate arm supports the spinner knob is an easily accessible elevated position for placing the same in the operative position.

These, together with various ancillary features and objects of the invention, which will later become apparent as the following description proceeds, are attained by the present invention, a preferred embodiment of which has been illustrated by way of example only in the accompanying drawings, wherein:

Figure 1 is an exploded perspective view of the steering wheel attachment;

Figure 2 is a side elevational view of the present invention showing the same in the operative position and attached to the rim of a steering wheel which is shown in section; and, Figure 3 is a vertical sectional view of the present invention showing the same attached to a portion of a steering wheel rim, and being taken substantially upon the plane of the section line 3—3 of Figure 2.

Reference is now made more specifically to the accompanying drawings, wherein like numerals designate similar parts throughout the various views, and in which a split clamp is indicated generally by the numeral 10. The split clamp 10 being formed of a loop 12, which is adapted to embrace the steering wheel rim 14, and having spaced apertured ends 16 and 18 for receiving a fastener 20. As will be understood, the loop 12 is formed of resilient material, so that the ends 16 and 18 may be spread apart and the same disposed in a position embracing a wheel rim 14, which is conventionally oval or circular in transverse section. The fastener 20 is used to urge the ends 16 and 18 toward each other for frictional engagement of the rim 14 by the loop 12. In the preferred construction, the fastener 20 comprises a bolt 22 and a nut 24 having rounded ends, and the ends 16 and 18 are rounded, as at 26 to avoid sharp projecting corners.

A base or laterally extending portion 28 is carried by the loop 12 adjacent the end 16, the base 28 being preferably integral with the loop 12 and the loop 12 and the end 16 are sufficiently thick to lend rigidity to the base 28.

An arcuate arm 30, enlarged and bifurcated at its lower end as at 32 to receive an upstanding ear 34 on the base 28, is pivoted to the base 28 by a bolt 36. The arm 30 is arcuately shaped so as to conform substantially to the transverse curvature of the rim 14 and the loop 12 as clearly shown in Figure 2. A spinner knob 38 is pivotally secured to the upper end of the arm 30 by a pivot 40.

As is thus far described, it will be clearly seen that the knob 38 is hinged for swinging movement with the arm 30 toward and away from a position where the knob 38 is adjacent the rim 14 and disposed on the top thereof. It will be noted from Figure 1 that the outward swinging movement of the arm 30 is limited by the side of the arm 30 engaging the upper surface of the base 28, the knob 38 in this limiting position for the arm 30 being held in a slightly elevated position that is disposed toward the center of a steering wheel which will be readily accessible to the driver of a vehicle.

Means is provided for urging the arm 30 outwardly from the loop 12, which comprises a spring 42 having laterally bent ends 44 that are received in apertures 46 provided in the arm 30 and the base 28. The spring 42 is twisted intermediate its ends to form a loop 48, by means of which the spring 42 is retained in operative position, with the bolt 36 extending through the loop 38 as shown in Figure 3.

Several important advantages flow from the construction of the present invention. The knob 38 is retracted to a position that will not become tangled up in the clothing of a driver or otherwise constitute a driving hazard, but in such a position it is still easily within the reach of a driver for use of the same. It is to be especially noted that the arm 30 by virtue of its arcuate shape does not interfere with the use of the knob 38, and that furthermore that it is disposed relative to the loop 12 in such a position as to not constitute a projection that would interfere with turning of the steering wheel. All being highly efficient and durable for the purposes intended, the attachment is simple in construction requiring few parts and is consequently low in cost.

From the foregoing, the construction and operation of the device wil be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A steering attachment for automobile steering wheels comprising a hand grip, said hand grip including an arcuate arm adapted to conform to the transverse curvature of a steering wheel rim and a knob extending laterally from one end of said member, means for hingedly securing the end of said arm opposite said knob to a steering wheel rim, and means yieldingly urging swinging movement of said arm outwardly from a steering wheel rim.

2. A steering attachment for automobile steering wheels comprising a hand grip, said hand grip including an arcuate arm adapted to conform to the transverse curvature of a steering wheel and a knob pivotally secured to one end of said member, a base together with means for mounting the same on a steering wheel rim, the end of said arm opposite said knob being hingedly connected to said base for swinging movement towards and away from a steering wheel rim, and a spring yieldingly urging swinging movement of said arm away from a steering wheel rim.

3. A steering attachment for automobile steering wheels comprising a split clamp which includes a loop having spaced ends for embracing a steering wheel rim, an outwardly extending portion on said loop adjacent one end thereof, an arcuate arm conforming substantially to the curvature of said loop, a knob pivotally secured to one end of said arm, the other end of said arm being pivotally connected to said portion for swinging movement of said knob towards and away from a position adjacent said loop and substantially diametrically opposite the spaced ends thereof, and a spring yieldingly urging swinging movement of said knob away from said loop.

RAYMOND CHAMBERS.

REFERENCES CITED

The following references are of record in the file of this patent:

UNITED STATES PATENTS

| Number | Name | Date |
|---|---|---|
| 2,139,546 | Hansen | Dec. 6, 1938 |
| 2,413,132 | Anderson | Dec. 24, 1946 |

FOREIGN PATENTS

| Number | Country | Date |
|---|---|---|
| 825,212 | France | Nov. 27, 1937 |